3,338,332
DEER STANDS
Howard W. Brantly, Sr., 148 Floyd Drive,
Mableton, Ga. 30059
Filed Jan. 21, 1966, Ser. No. 524,653
7 Claims. (Cl. 182—187)

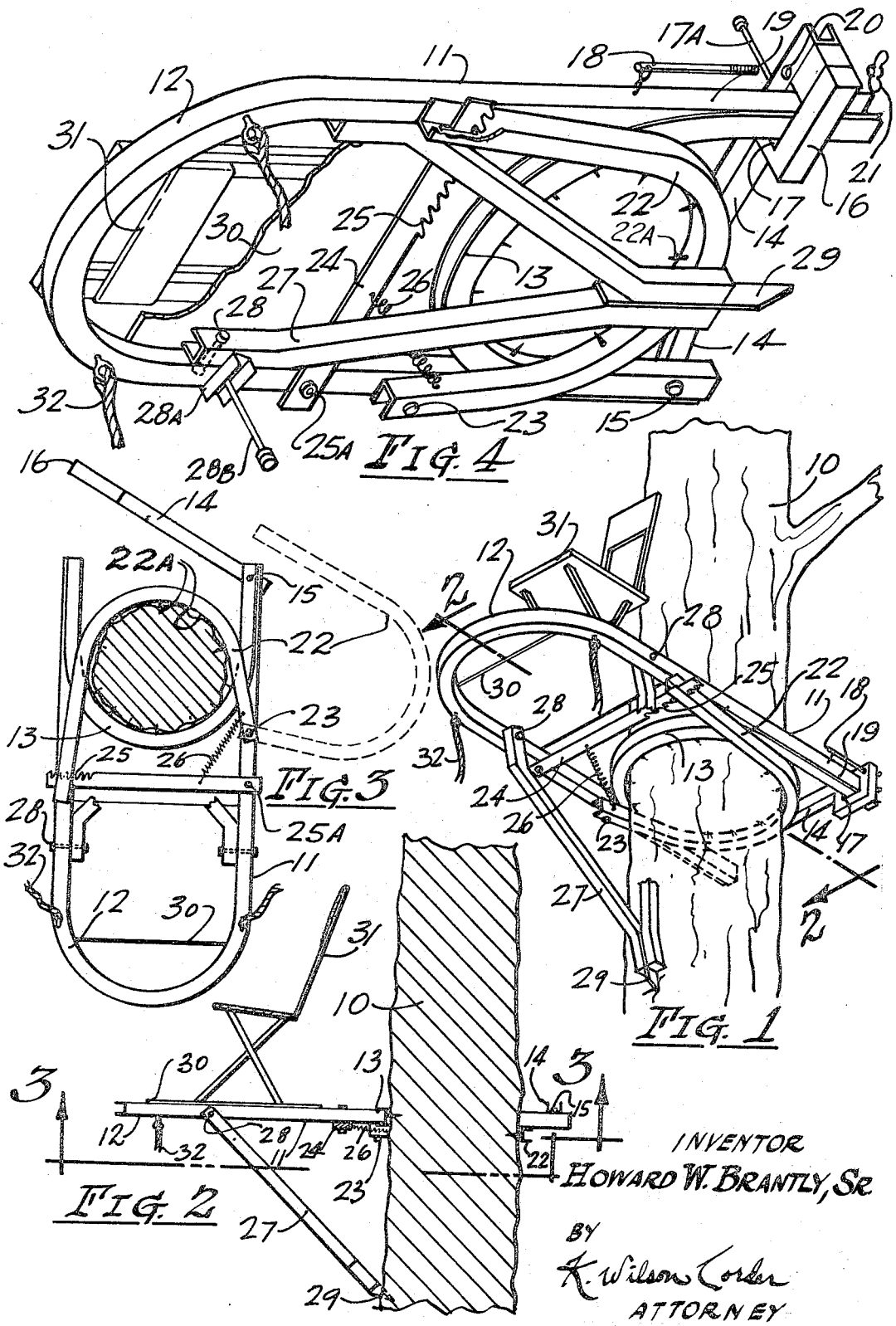

ABSTRACT OF THE DISCLOSURE

A deer stand connectable to the trunk of an upwardly extending tree, where a hunter can hide and rest while waiting for a deer, above the scent level of the deer. The stand includes a U-shaped bracing element constructed to have its concave inner surface rest against the front of the tree, a clamping bar connectable to the legs of the U-shaped bracing element at the rear of the tree, a platform supported by the U-shaped bracing element and clamping bar, and braces extending downwardly at an angle from the platform which engages the trunk of the tree at a point below the U-shaped bracing element.

This invention relates to game hunting, and more particularly, to a new and improved deer stand to be attached to the trunk of a tree at a point well above the ground and near or adjacent a trail usually followed by these animals on their way to water, feeding grounds and the like. Here a hunter can wait in comparative comfort for the animal to approach, and then slay him if everything continues favorable.

Heretofore it has been customary for hunter to select spots adjacent deer trails very early in the morning and then wait possibly for hours for the animal to appear before getting a shot at him. The weather during deer season is often, rainy and disagreeable, and the chances of the hunter being scented by the animal are much greater if the hunter is on the same level with him.

An object of the instant invention is to provide a deer stand that is well above the ground, thereby reducing chances of detection.

Another object is to provide a stand with a chair in which the hunter can sit with reasonable comfort while waiting for his quarry.

Another object is to provide such a device that is portable, and can be moved from point to point during the hunting season if this be so indicated.

Another object is to provide economy and simplicity in such a device.

A still further object is to insure safety therein.

Another object is to make possible access to and easy withdrawal from a deer stand.

Another object is to make possible reasonable camouflage of such a stand with a minimum of effort if so desired.

These and other objects made apparent during the further progress of this specification are accomplished by means of the instant invention, a full and complete understanding of which is facilitated by reference to the drawing herein in which:

FIG. 1 is a view in perspective showing the device mounted on the trunk of a tree, ready to be used by a hunter;

FIG. 2 is a view partially in section, taken along the line 2—2 of FIG. 1, looking in the direction of the arrows;

FIG. 3 is likewise a sectional view, taken along the line 3—3 of FIG. 2; and

FIG. 4 is an enlarged view of the under-side of the instant deer stand, in collapsed or carrying position.

Referring now to the drawings, in which identical numerals designate corresponding or similar elements throughout the various figures thereof, 10 represents the trunk of a tree or other anchoring or supporting instrumentality to which is secured the stand per se, broadly indicated by the numeral 11.

Said stand comprises a generally U-shaped platform-supporting member 12 preferably channel shaped in cross-section to give added strength, and having formed integral therewith a similarly shaped curve bracing element 13, the forwardly extending curvature of which is calculated to roughly conform to that of tree 10 to which the stand is attached. A clamping and safety bar 14 is hingedly mounted to one end of 12 in conjunction with 13, as at 15, the opposite end of 14 being provided with a clamp 16 having an aperture 17 formed therein to receive one end of 12–13. A safety bolt 17A is provided to hold clamp 16 and hence bar 14 in place once the device is positioned against the face of a tree, and a bolt 18 is anchored near one end of 12 as at 19 to pass through an opening 20 in clamp 16, and in conjunction with a wing-nut 21 add to the safety features of the invention at this point.

An adjustable primary holding clamp 22, pivotally mounted as at 23, passes around the rear of the tree to engage a ratchet member 24 having conventional teeth 25, which ratchet is hinged to 12 as at 25A on one side and passed through 22 on the other, thus making possible a snug and even tight adjustment of elements 12–13–22 with tree 10 when all parts are in operative position. As clamp 22 approaches its full line position, as is shown in FIG. 3, ratchet member 24 is inserted through the slot defined in the end portion of clamp 22, and teeth 25 engage the edge of the slot. Spring 26 biases teeth 25 into engagement with clamp 22. Since the pivot points of clamp 22 and ratchet member 24 are offset from each other, a tight fit of clamp 22 about the tree moves the slot of clamp 22 further down teeth 25 of ratchet member 24. Thus, ratchet member 24 and clamp 22 effectively form a triangular linkage, with the slot of clamp 22 and teeth 25 of ratchet member 24 cooperating with each other to adjust the area defined between these members. Obviously, clamp 22 and ratchet member 24 can be disconnected from each other by slipping teeth 25 out of engagement with the edge of the slot, against the bias of spring 26. Spike-like members 22A are preferably anchored to the tree-engaging portions of 13 and 22, adjacent the inner circumferences thereof for additional safety-protection.

A pair of braces 27 hinged to 12 at 28 and having a sharp point 29, taper to form a triangle at this point and serve to stabilize platform 30 and support 12 with a variation of what amounts to the old milk stool engineering principle. 28A is a generally U-shaped flat spring secured to supporting element 12 by means of a bolt 28B for the purpose of holding braces 27 in a generally flat position when the device is collapsed. A collapsible chair 31 is securely mounted on said platform; and a rope ladder 32 permitting the hunter to ascend to the stand and then withdraw such upwardly to the platform in order to lessen the chance of detection by virtue of wild game's keen olfactory process; is likewise secured at this point.

From the foregoing it is believed that the operation and structure of the instant invention will be obvious, and accordingly, no more time need be devoted thereto.

It is further apparent that a new, unique, economical and efficient deer stand has been taught herein, and that while one form thereof has been described in some detail, no limitation is implied thereby, but on the contrary that various changes, additions, subtractions and modifications may be resorted to without departing from the appended claims, which are to be accorded a construction and scope fairly in keeping with the contribution to the art.

I claim:
1. In a device of the character described, in combination, a platform support member, a semi-circular reinforcing element rigidly connected to said platform support member and shaped to engage the trunk of a tree, a bar pivotally mounted to one end of said platform support member, a clamp mounted on the end of said bar and to engage the opposite end of said platform support member from that to which it is mounted, locking means for securing said clamp in positive engagement with said support and reinforcing element, a primary holding clamp pivotally mounted to said platform supporting element for passing around the rear of a tree trunk, a ratchet member pivotally mounted at one end to said platform support member and engaging said primary holding clamp at its opposite end, thereby adjustably mounting the assembly to a tree at a desired distance above the ground; a plurality of braces terminating in a sharp point mounted adjacent the outer edges of the platform support member and extending angularly downwardly for forming a generally triangular structure with a tree, and a platform securely mounted on said platform supporting member.

2. The device of claim 1, in which a seating member is firmly mounted on the platform secured to the platform supporting element.

3. The device of claim 1, in which a foldable chair is anchored to the top of the platform.

4. The device of claim 1, in which a rope ladder is attached to the platform supporting member to provide access and egress thereto and therefrom.

5. The device of claim 1, in which the ratchet element is provided with a spring to facilitate operative engagement of the ratchet with the primary holding clamp.

6. The device of claim 1, in which the semi-circular reinforcing element and primary holding clamp are provided with inwardly extending spike-like members to facilitate their hold on the trunk of a tree when in operative position.

7. A platform apparatus for connection to the trunk of a tree comprising:
   a platform support member including an outwardly faced U-shaped bracing element sized and shaped to surround and engage a circumferential portion of the trunk of a tree,
   a U-shaped holding clamp pivotally connected to said platform support member and pivotal to an inwardly facing position to surround and engage the remaining circumferential portion of the trunk of the tree,
   a ratchet member pivotally connected at one of its ends to said platform support member and releasably connected at its other end to said U-shaped holding clamp,
   a bar pivotally connected at one of its ends to a leg of said U-shaped bracing element and releasably connected at its other end to the other leg of said U-shaped bracing element, and
   bracing means extending at an angle downwardly from said platform support member for engagement with the tree at a point below said platform support member.

References Cited
UNITED STATES PATENTS

| | | | |
|---|---|---|---|
| 190,760 | 5/1877 | Jackson | 108—151 |
| 1,098,945 | 6/1914 | Frederick | 182—187 |
| 1,237,428 | 8/1917 | Watrous | 248—216 |
| 2,775,489 | 12/1956 | Hagadorn | 182—187 |

REINALDO P. MACHADO, *Primary Examiner.*